(12) United States Patent
Emanuel et al.

(10) Patent No.: US 10,066,760 B2
(45) Date of Patent: Sep. 4, 2018

(54) VALVE POSITION INDICATOR

(71) Applicant: Trumbull Manufacturing, Inc., Youngstown, OH (US)

(72) Inventors: Blake J. Emanuel, Hubbard, OH (US); Francis Craig Newmeyer, Niles, OH (US)

(73) Assignee: TRUMBULL MANUFACTURING, INC., Youngstown, OH (US)

( * ) Notice: Subject to any disclaimer, the term of this patent is extended or adjusted under 35 U.S.C. 154(b) by 205 days.

(21) Appl. No.: 15/151,888

(22) Filed: May 11, 2016

(65) Prior Publication Data

US 2016/0290528 A1   Oct. 6, 2016

Related U.S. Application Data

(63) Continuation of application No. 13/890,556, filed on May 9, 2013, now Pat. No. 9,347,583, which is a (Continued)

(51) Int. Cl.
*F16K 37/00* (2006.01)
*F16K 31/46* (2006.01)
(Continued)

(52) U.S. Cl.
CPC .......... *F16K 37/0016* (2013.01); *E03B 7/095* (2013.01); *F16K 27/12* (2013.01); *F16K 31/46* (2013.01)

(58) Field of Classification Search
CPC ... E03B 7/09; E03B 7/095; E03B 9/10; E03B 9/16; F16K 31/46; F16K 37/0008; F16K 37/0016; F16L 2201/80
(Continued)

(56) References Cited

U.S. PATENT DOCUMENTS 3,951,172 A * 4/1976 Flegel .................... E03B 9/10
                                                        138/89
5,404,899 A * 4/1995 Zabel et al. .......... E03B 9/10
                                                       137/15.02
(Continued)

FOREIGN PATENT DOCUMENTS

FR    2380381 A1 *  9/1978 ............. E03B 7/095
FR    2609525 A1 *  7/1988 ............. E03B 9/10
JP    H064175 U *   1/1994 ............. E03B 9/10

*Primary Examiner* — R. A. Smith
(74) *Attorney, Agent, or Firm* — Tucker Ellis LLP

(57) ABSTRACT

A valve position indicator assembly is disclosed herein. The valve position indicator assembly includes a gearing assembly operable to transmit an input rotation to an output rotation. The gearing assembly includes a first gearing member driven to the output rotation by the input rotation. A rate of the output rotation is a fraction of and less than a rate of the input rotation. The valve position indicator assembly includes: a position indicia engaged with the first gearing member such that the indicia and the first gearing member move together; a scale plate including a plurality of graduated indicia defining a scale of rotation movement of the first gearing member; a mounting bracket comprising a first slot having a length extending between a first end and a second end; and a debris shield having a first end, second end, and inclined frustoconical sides.

10 Claims, 14 Drawing Sheets

Related U.S. Application Data continuation of application No. 12/831,745, filed on Jul. 7, 2010, now Pat. No. 8,550,115.

(60) Provisional application No. 61/227,232, filed on Jul. 21, 2009.

(51) Int. Cl.
*F16K 27/12* (2006.01)
*E03B 7/09* (2006.01)

(58) Field of Classification Search
USPC ........ 116/277; 137/356, 357, 360, 551, 553, 137/556, 556.3, 556.6; 248/67, 67.7, 69, 248/70, 207, 220.21, 220.22, 221.11, 248/231.9
See application file for complete search history.

(56) References Cited

U.S. PATENT DOCUMENTS

| | | | | |
|---|---|---|---|---|
| 5,439,130 A * | 8/1995 | Waugh | ...................... | E03B 9/10 138/89 |
| 5,778,934 A * | 7/1998 | Campbell | ............. | F16L 55/115 138/89 |
| 5,951,200 A * | 9/1999 | Barton | ................... | E02D 29/12 404/25 |
| 9,447,910 B2 * | 9/2016 | Schaaff | ..................... | E03B 7/07 |
| 2006/0260688 A1 * | 11/2006 | Green | ...................... | E03B 9/10 137/371 |
| 2014/0054236 A1 * | 2/2014 | Bennett | ................. | E03B 7/095 210/747.3 |

* cited by examiner

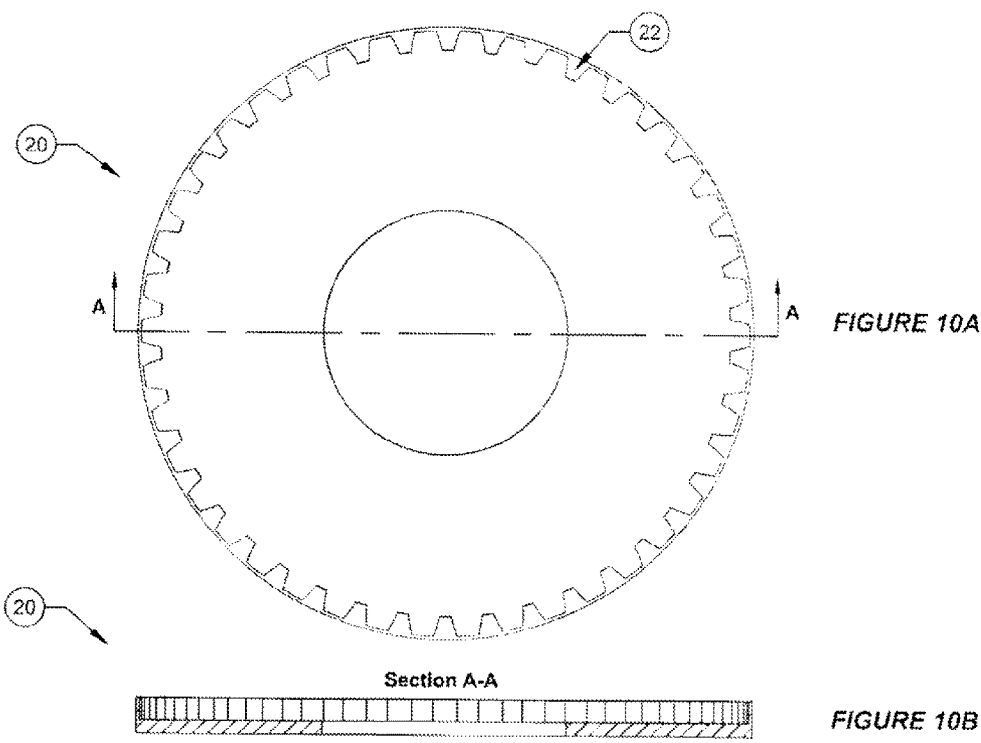
*FIGURE 10A*
*FIGURE 10B*
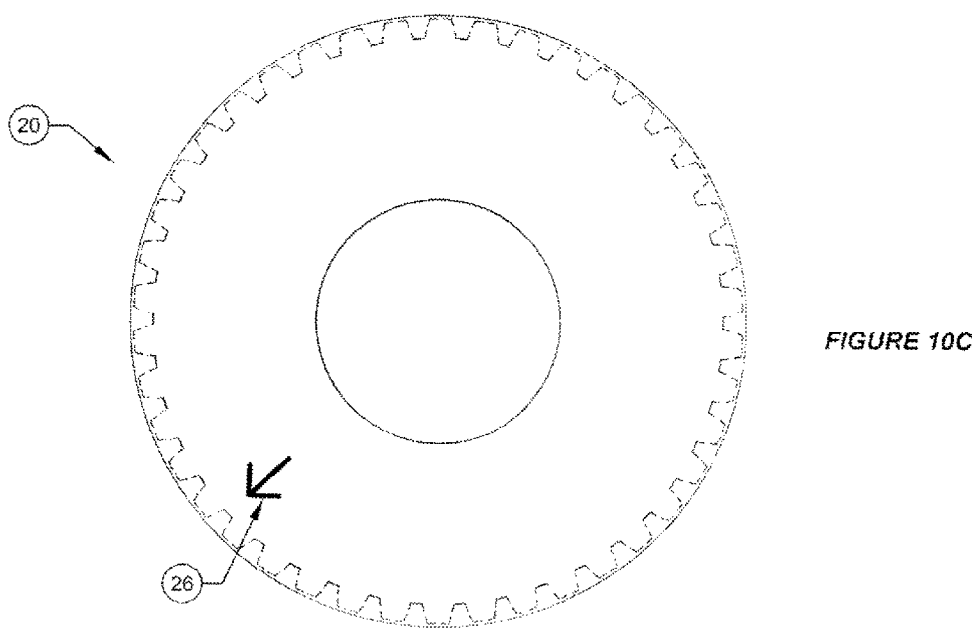
*FIGURE 10C*

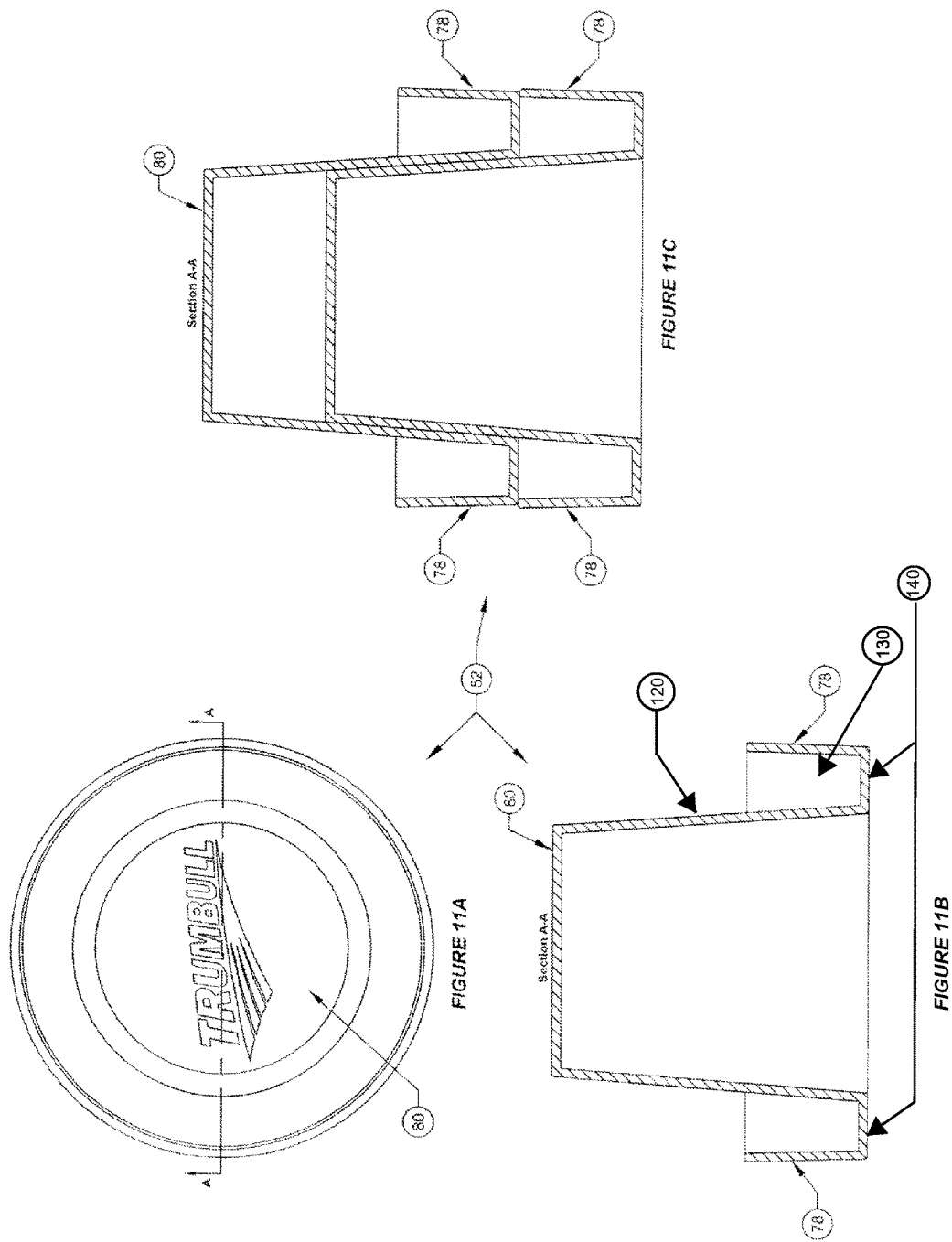

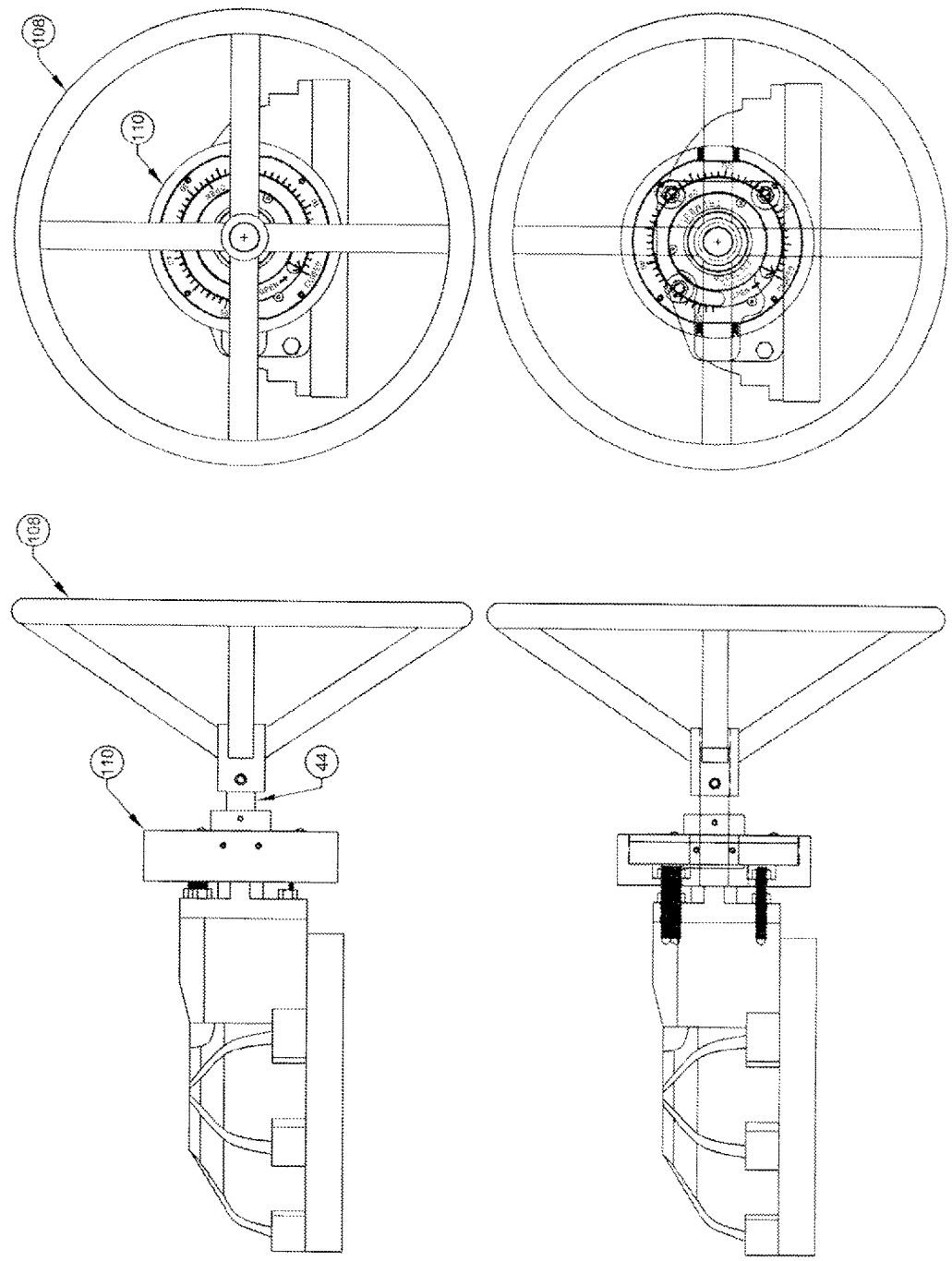

VALVE POSITION INDICATOR

CROSS REFERENCE TO RELATED APPLICATIONS

This application is a continuation of and claims the benefit of priority to U.S. application Ser. No. 13/890,556 for a VALVE POSITION INDICATOR, filed on May 9, 2013, which is a continuation of U.S. Ser. No. 12/831,745, now issued as U.S. Pat. No. 8,550,115 for a VALVE POSITION INDICATOR, filed on Jul. 7, 2010 and issued Oct. 8, 2013, and also claims the benefit of U.S. Provisional Patent Application Ser. No. 61/227,232 for a VALVE POSITION INDICATOR, filed on Jul. 21, 2009, all of which are hereby incorporated by reference in their entireties.

BACKGROUND OF THE INVENTION

1. Field of the Invention

The invention generally relates to valves and more specifically to valve position indicators.

2. Description of Related Prior Art

U.S. Pat. No. 4,411,288 discloses a VALVE POSITION INDICATOR WITH VARIABLE INDICATOR PLATES. That invention relates to a valve position indicator for buried valves having a rotatably operated shaft extended to ground level. A sealed gear box unit non-rotatably mounted inside the valve position indicator has a transmission mechanism mounted about the operator shaft to effectively move an indicating device at a predetermined arc distance for every shaft revolution. Adjustable indicator plates are angularly disposed on the cover of the gear box unit to provide open and closed reference points for the indicating device. The plates are securable in a manner to permit application to valves requiring different number of turns to move the valves between their open and closed positions.

SUMMARY OF THE INVENTION

A debris shield for a valve position indicator is disclosed herein. The debris shield includes a first end, a second end, an outwardly extending annular pocket, and, inclined frustoconical sides such that an inner diameter of the pocket at the first end of the debris shield is greater than an outer diameter of the shield at the second end of the debris shield. A valve position indicator assembly is also disclosed herein. The valve position indicator assembly includes a gearing assembly operable to transmit an input rotation to an output rotation. The gearing assembly includes a first gearing member driven to the output rotation by the input rotation. A rate of the output rotation is a fraction of and less than a rate of the input rotation. The valve position indicator assembly also includes a position indicia engaged with the first gearing member such that the indicia and the first gearing member jointly move together. The valve position indicator assembly also includes a scale plate including a plurality of graduated indicia defining a scale of rotation movement of the first gearing member. The scale plate is disposed proximate to the first gearing member such that the position indicia passes across the scale of the scale plate during the output rotation. The valve position indicator assembly also includes a mounting bracket comprising a first slot having a length extending between a first end and a second end. The gearing assembly and the position indicia and the scale plate are mounted with respect to the first slot for adjustable positioning over at least part of the length.

BRIEF DESCRIPTION OF THE DRAWINGS

FIG. 10A shows the bottom surface of the top ring gear;
FIG. 10B shows a sectional view of the top ring gear;
FIG. 10C shows the top surface of the top ring gear;
FIG. 11A shows a top view of the debris shield;
FIG. 11B shows a sectional view of the debris shield;
FIG. 11C shows a sectional view of stacked debris shields;

FIG. 14 shows a perspective view of the position indicator and gear operator installation.

DETAILED DESCRIPTION OF EXEMPLARY EMBODIMENT

Figure 1:
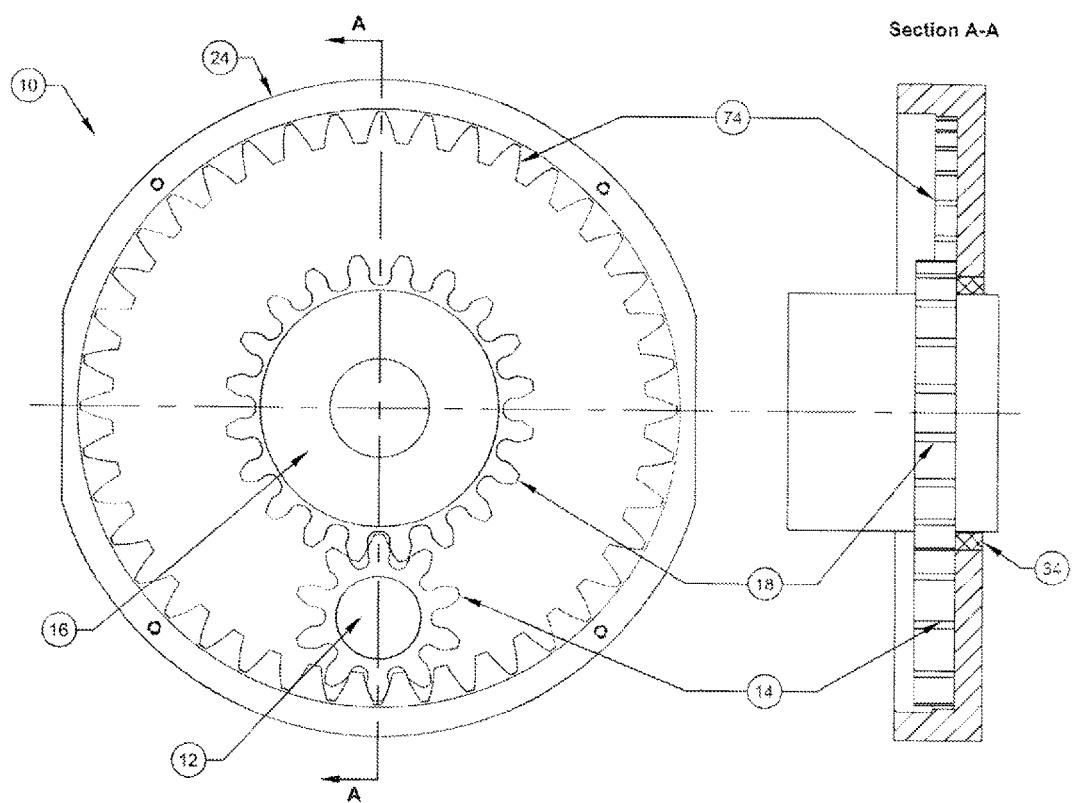
FIG. 1 shows a top and sectional view of the epicyclic gear assembly, with the sun gear, planet gear, and bottom ring gear.
Figure 2:
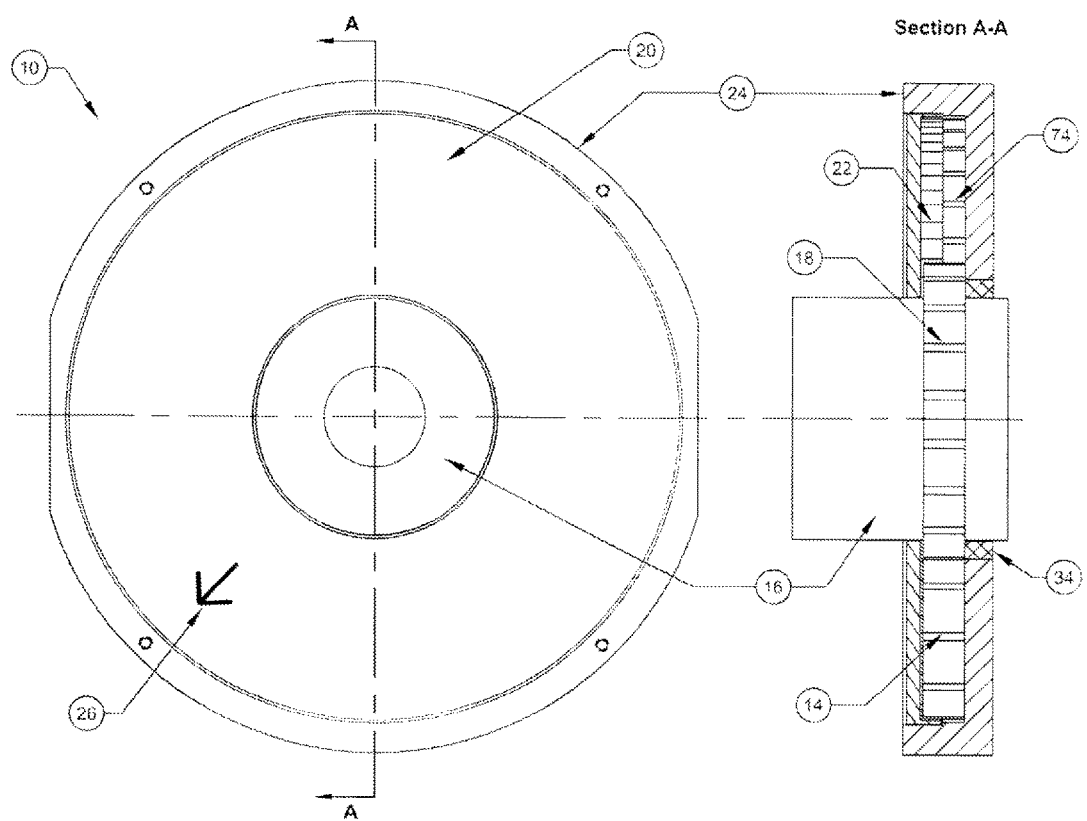
FIG. 2 shows a top and sectional view of the epicyclic gear assembly; with the top ring gear in place, covering the sun gear, planet gear, and bottom ring gear.

The exemplary embodiment is a useful accessory in many types of valve installations. It is beneficial to a valve operator by means of allowing him/her to identify the position of a valve, with respect to "open," "closed," or an intermediate position, in addition to the number of turns from the open position and direction of rotation. With reference now to FIGS. 1 and 2, the FIGURES show an epicyclic gear assembly 10, which comprises a planet gear 12, planet gear teeth 14, sun gear 16, sun gear teeth 18, top ring gear 20, top ring gear teeth 22, bottom ring gear 24, and bottom ring gear teeth 74. The planet gear teeth 14 engage with the sun gear teeth 18, as well as the top ring gear teeth 22, and the bottom ring gear teeth 74. The various gears 12, 16, 20, 24 define an exemplary gearing assembly operable to transmit an input rotation to an output rotation. The input rotation is input to the sun gear 16 and the output rotation is exhibited by the ring gear 20. The ring gear 20 can be viewed as an exemplary first gearing member.

With reference now to FIGS. 3, 4A, 4B, 5, 6A, 6B, 7B, 7C, 8, and 12, a position indicator 30 is shown. The position indicator 30 allows position indication on different types of valves 40, which typically open left (ccw) or open right (cw). A valve 40 is installed in a pipeline 42 and is manually operated using a "key" or T-wrench 38. The top face of the scale plate 72 has an annular recess 88 with an adjustable window 36 that is used for valves 40 that open left (ccw) and the bottom face of the scale plate 72 has an annular recess 88 with an adjustable window 36 that is used for valves 40 that open right (cw). The position indicator 30 is ready to be installed on a valve operating stem 90. Subsequently, if the position indicator 30 is to be installed on a valve 40 that opens in the opposite direction of the initial assembly, the scale plate 72 can be removed, flipped 180 degrees, and reinstalled to allow indication in the opposite direction.

The scale plate 72 is fastened to the bottom ring gear 24 by means of four socket head cap screws 64, which facilitate removal and reversal of direction indication.

A number indicator 76 defines a plurality of graduated indicia defining a scale of rotation movement of the indicia 26 and the top ring gear 20. Thus, the scale plate 72 includes a plurality of graduated indicia defining a scale of rotation movement of the first gearing member. The scale plate 72 is disposed proximate to the top ring gear 20 such that the position indicia 26 passes across the scale of the scale plate 72 during the output rotation. In addition to the turn number indicator 76 that is present on each side, a first side 72a and a second side 72b opposite the first side 72a, of the scale plate 72, an annular recess 88 is present on each side for placement of the adjustment window 36. A 300 to 325 degree annular slot 28 is located through the scale plate 72 in the center of the annular recess 88, for viewing the position indicator arrow 26, located on the top "floating" ring gear 20, which is below the scale plate 72. The position indicator arrow 26 is a position indicia engaged with the ring gear 20 or first gearing member such that the indicia 26 and the first gearing member jointly move together.

In one embodiment, the adjustable window 36 is a flat transparent ring with the word "OPEN" on it, and an indicating line located on the top surface. The window 36 is placed in the annular recess 88 located on the "in use" side of the scale plate 72, calibrated for the specific valve 40 it is installed on, and then secured to the scale plate 72. Calibration is achieved by aligning the indicating line on the window 36 with the number of turns it takes to open the valve 40 from the closed position, on the turn number indicator 76, located on the scale plate 72.

In one embodiment, the window 36 is secured with button head cap screws (BHCS) 66 on the scale plate 72. As each BHCS 66 is threaded into the scale plate 72, the outer diameter of each head captures the top surface of the window 36, which protrudes beyond the top surface of the scale plate 72, and secures the components together.

In one embodiment, the scale plate 72 and window 36 are pre-assembled to accommodate a valve 40 with a specific number of turns to open. Subsequently, the scale plate 72 can be flipped 180 degrees and reinstalled to allow indication in the opposite direction. In one embodiment, removal of the scale plate 72 is accomplished by unscrewing four socket head cap screws (SHCS) 64, which hold the scale plate 72 to the bottom ring gear 24. After the scale plate 72 is flipped 180 degrees, each SHCS 64 can be reinstalled in the reverse order of removal. No additional components are required to complete this changeover.

In one embodiment, the outside diameter of the sun gear 16 is sealed to prevent water from entering the position indicator 30 and fogging the lens of the adjustable window 36. The position indicator 30 can either be sealed or not sealed. Each version is essentially the same, except the sealed version is manufactured with two seals 34 used to prevent water and debris intrusion. In one embodiment, the seal 34 is located between the sun gear 16 and scale plate 72 and the other seal 34 is located between the sun gear 16 and the bottom ring gear 24.

Figure 7A:
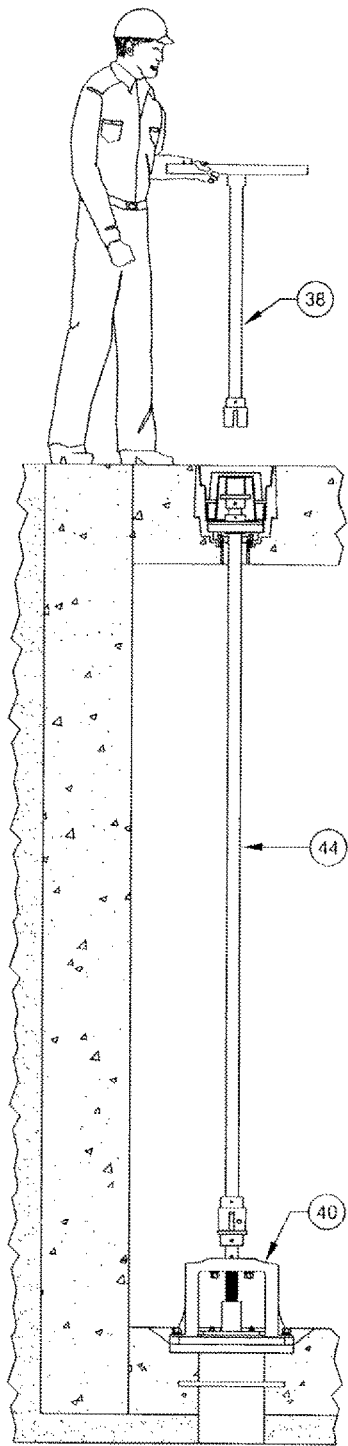
FIG. 7A shows a perspective view of the position indicator and adapter installation for valves in a tank or reservoir.
Figure 7B:
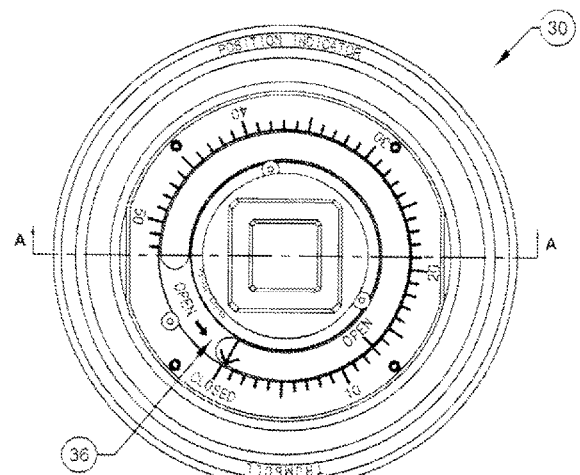
FIG. 7B shows a top view of the position indicator with a square nut inside an adapter for valves in a tank or reservoir.
Figure 7C:
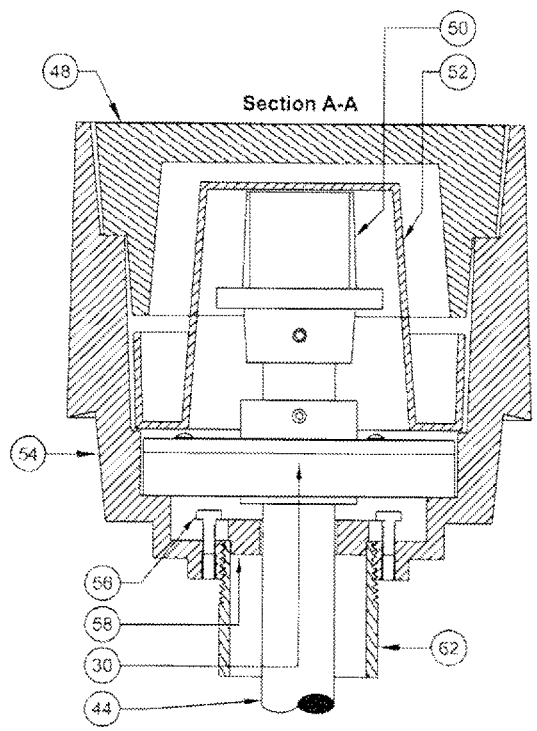
FIG. 7C shows a sectional view of the position indicator installed in an adapter, with a debris shield, square nut, and pipe nipple for embedding into concrete floor of a tank or reservoir.
Figure 8:
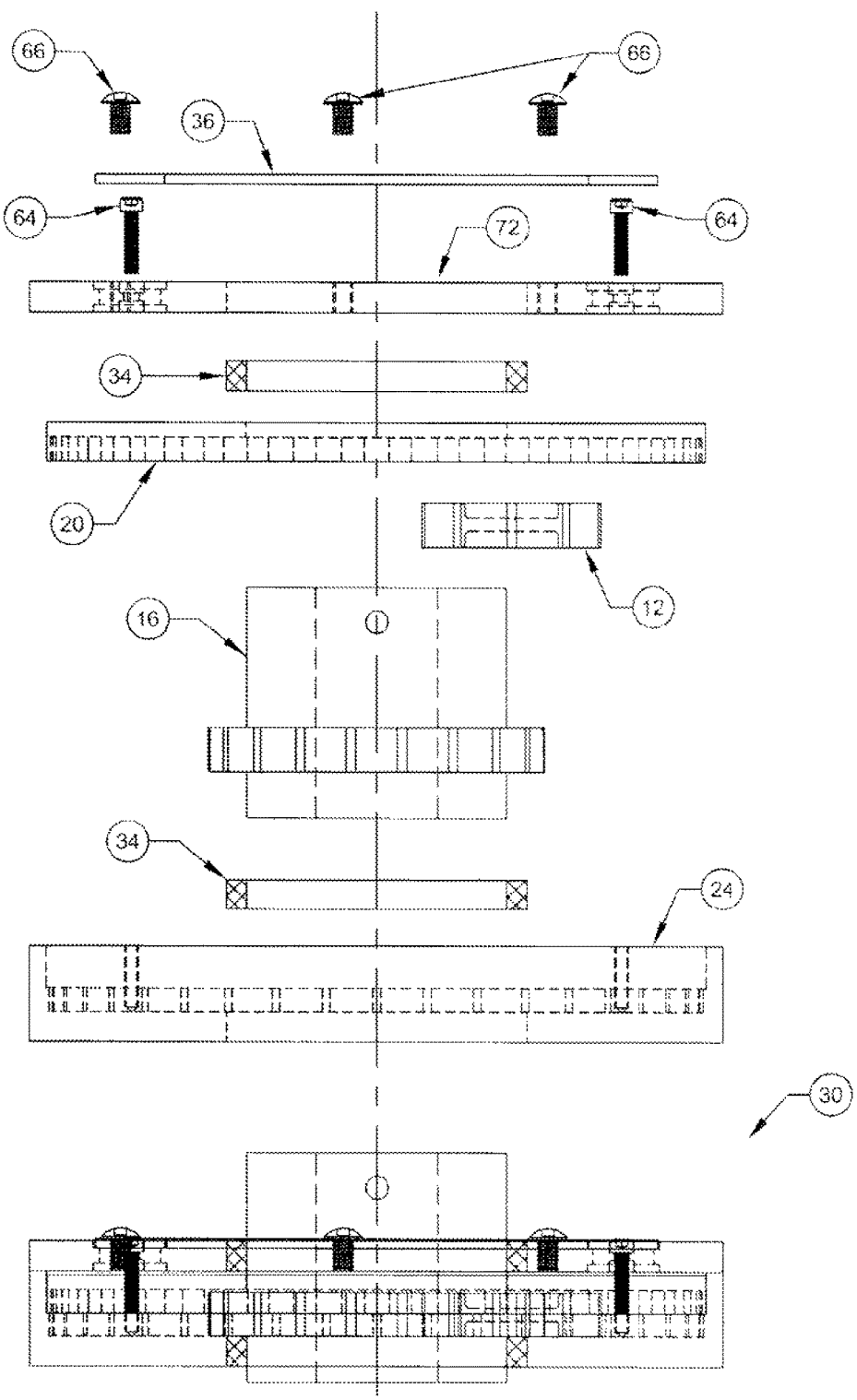
FIG. 8 shows an exploded view of the position indicator.
Figure 9A:
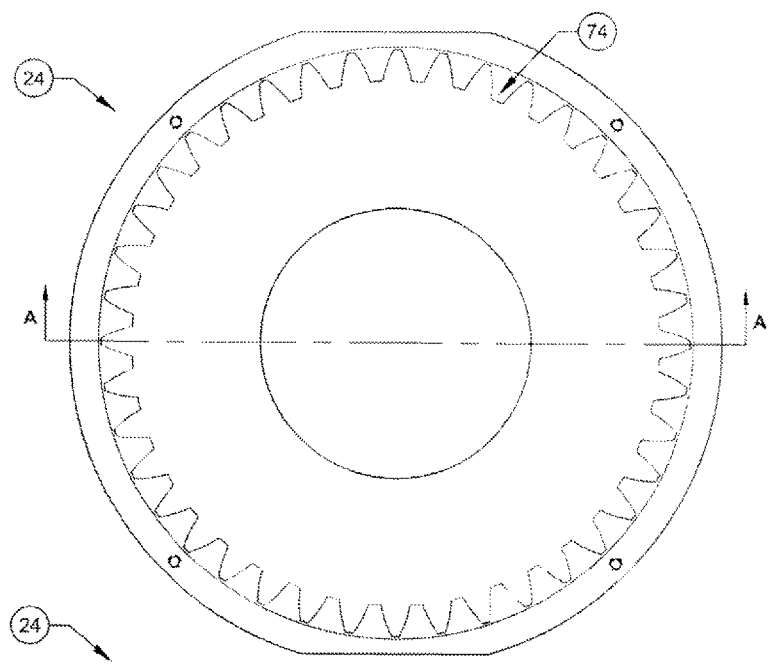
FIG. 9A shows the top surface of the bottom ring gear.
Figure 9B:
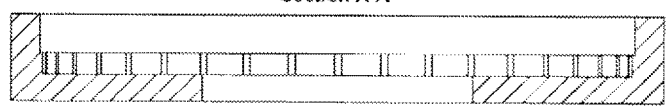
FIG. 9B shows a sectional view of the bottom ring gear.
Figure 9C:
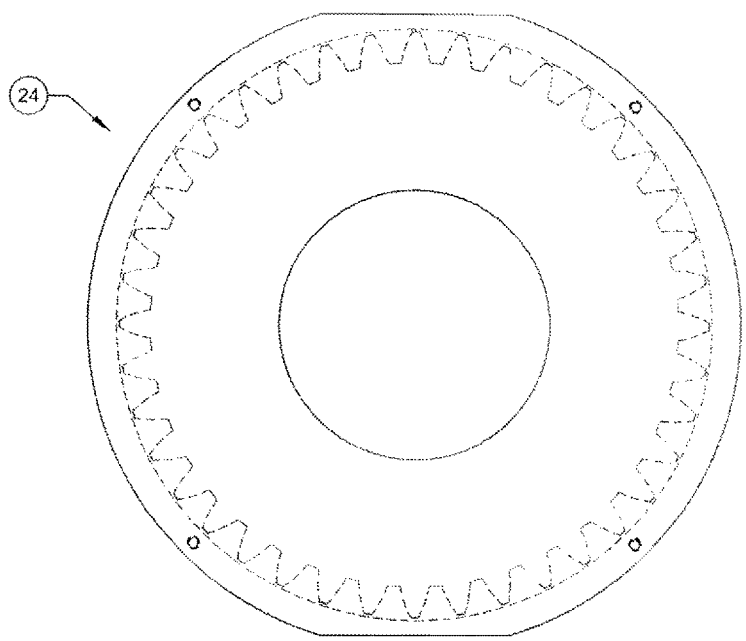
FIG. 9C shows the bottom surface of the bottom ring gear.
Figure 12:
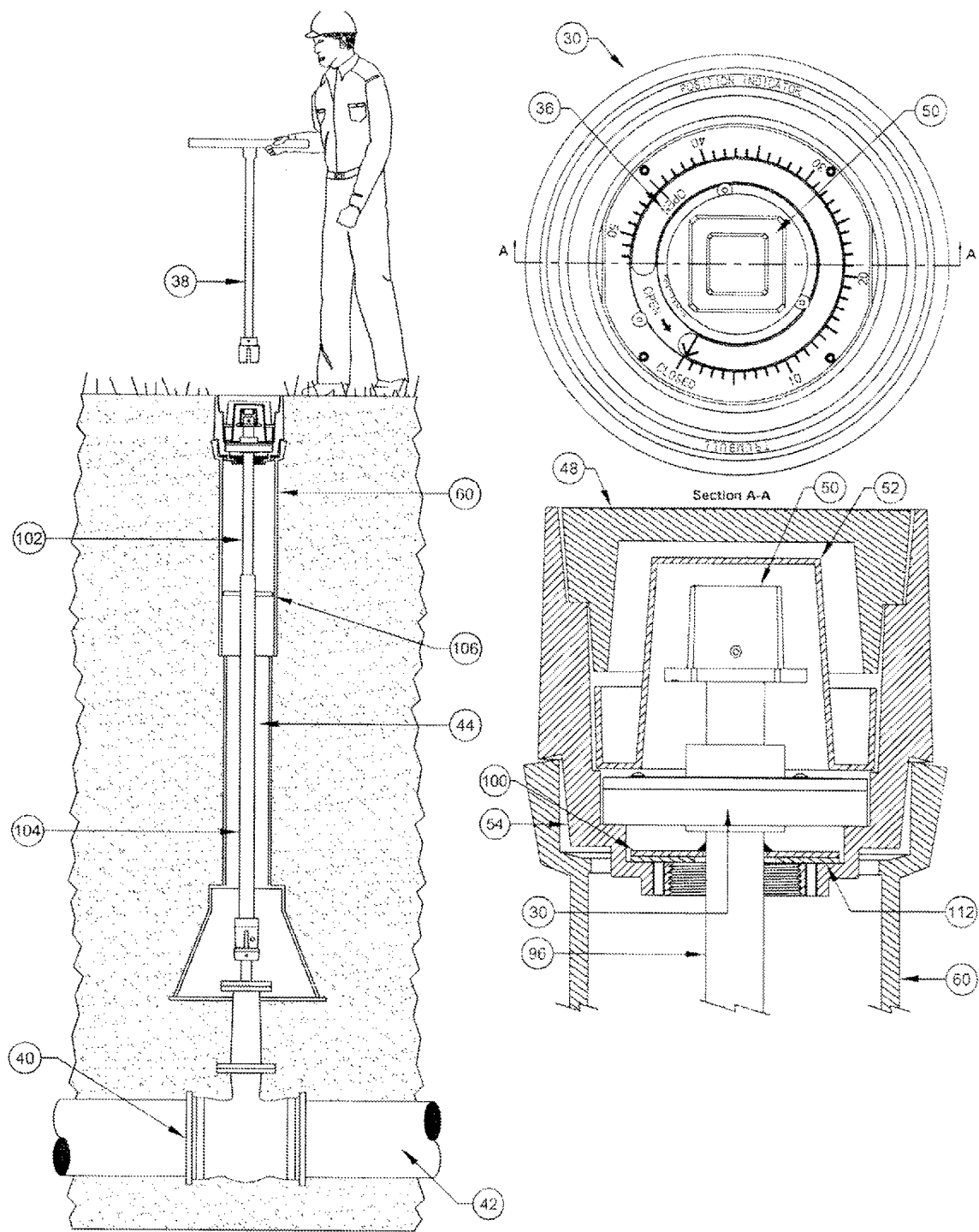
FIG. 12 shows a perspective view of the position indicator and adaptor with telescoping functionality.

With reference now to FIG. 12, installing a position indicator on a buried valve is more challenging than the installation on a valve in a tank or reservoir (see FIGS. 7A, 7B, and 7C). In both cases, the position indicator is housed within a cast iron adapter 54. As can be seen from the drawings, the 2 inch square nut 50 operating the valve 40 has limited clearance above the position indicator and below the valve box lid 48. The difficulty arises in determining the precise length of the extension stem 44, to meet the required clearances for the nut 50. For a valve installed in a tank or reservoir, the installer can make adjustments to the extension stem 44 length by cutting from the exposed length below the adapter 54. There is access below the adapter 54 to connect the shortened length to the valve 40. In a valve box 60, there is no access below the cast iron adapter 54 for the installer to cut the extension stem 44 length and connect to the valve 40. The length required depends on the finished grade of the valve box 60, which is difficult to predict precisely, and generally is a final field adjustment. A square telescoping extension stem 96 is unique for use with a position indicator installed on a buried valve. A telescoping design gives the installer the needed flexibility when ordering the extension stem length needed for the approximate valve installation depth. In one embodiment, the upper telescoping stem 102 can be 1¼ inch square tubing and can slide inside 1½ inch square tubing (the dimensions of the tubing can be any dimension chosen using sound engineering judgment). The lengths of the two components can provide a minimum of six inches of engagement of the smaller component inside the larger component, to transmit the operating torque. The additional length beyond the required engagement can provide an adjustment range of depth that the installer can count on when ordering for predicted depths of bury. The upper stem 102 (1¼ inch) can have a stop plate 100 to insure that the nut 50 can be located at the exact height required for clearances above and below the position indicator. Between the stop plate 100 and adapter 54 is an anti-friction disk 112, used to reduce friction between the two metal components. The lower telescoping stem 104 can have a centering ring 106 to keep it centered inside the valve box 60, making it easier to locate and slide the upper stem 102 within it. The use of telescoping stems 96 and stop plates 100 can save the installer time and difficulty in field cutting and locating the nut 50 and the precise location required.

Figure 13:
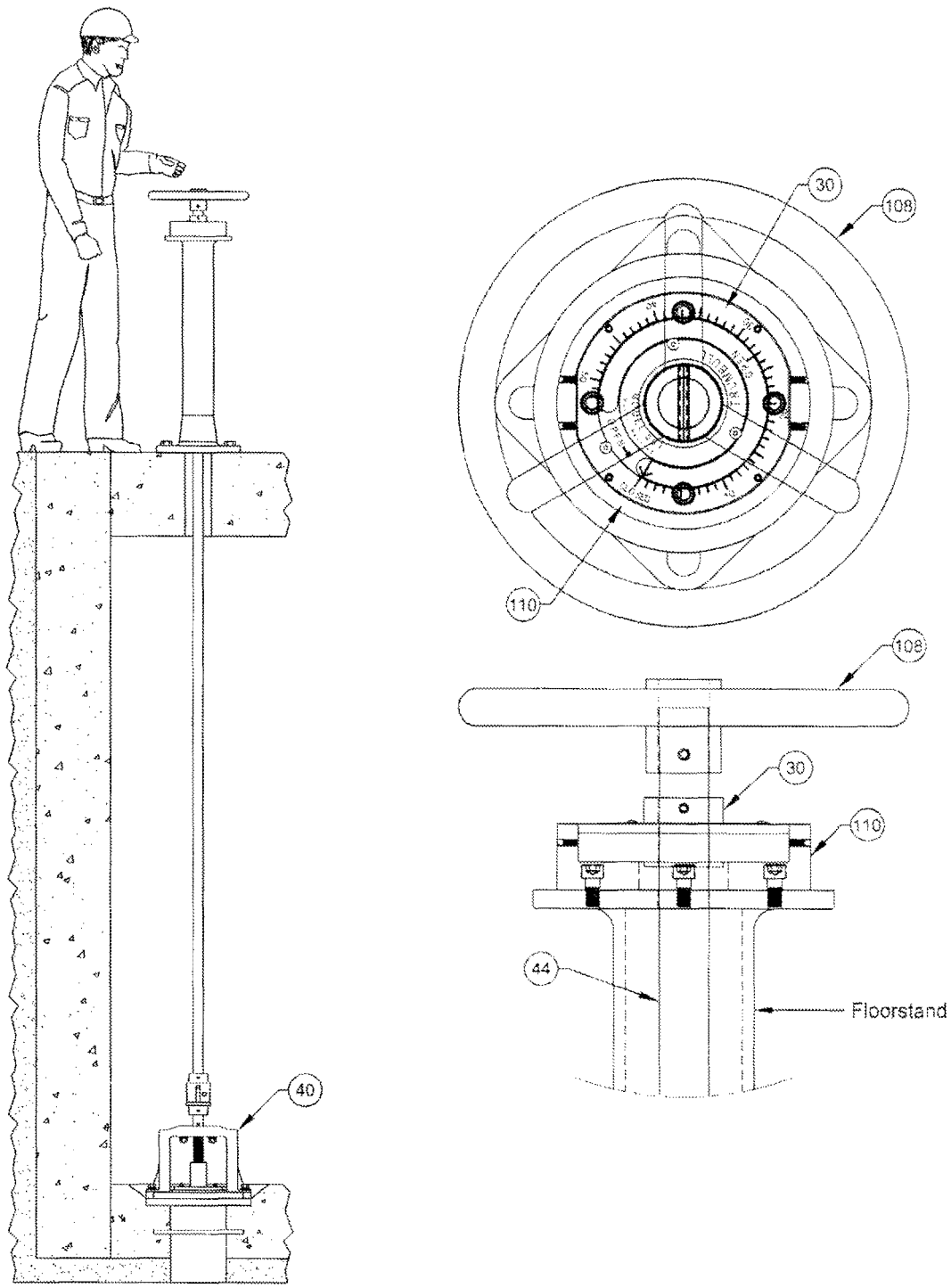
FIG. 13 shows a perspective view of the position indicator and floorstand installation.

With reference now to FIG. 13, the operation of a valve 40 is assisted by a floorstand. Many valves are installed in a lower floor of a building but operated from a higher floor level, through a floorstand, by means of rotating a handwheel 108. Some floorstands provide indication of the valve's position, while others do not. In one embodiment, the position indicator 30 can be mounted on the top flange of the floorstand by means of a mounting plate 110. With reference now to FIG. 14, the operation of the valve 40 is assisted by a gear operator. Some gear operators provide indication of the valve's position, while others do not. In this embodiment, the position indicator 30 can be mounted on a gear operator by means of a mounting plate 110, and operated by means of a handwheel 108 to allow for ease of operation. The gear operator can be a miter gear, a bevel gear, or any other suitable gear depending on the desired application.

Several different embodiments can indicate (from 300° to 325°) from 0 to 52 turns, 0 to 57 turns, 0 to 102 turns, 0 to 111 turns, 0 to 252 turns, 0 to 275 turns, 0 to 402 turns, 0 to 434 turns, 0 to 502 turns, 0 to 545 turns, 0 to 802 turns, and 0 to 870 turns. Each model consists of a sun gear 16, planet gear 12, bottom "fixed" ring gear 24, top "floating" ring gear 20, scale plate 72, adjustable window 36, and hardware, such as BHCS 66 and SHCS 64, which is used to secure certain components together. Thus, a rate of the output rotation can be a fraction of and less than a rate of the input rotation. The input to each gear system is the sun gear 16, which is secured to and rotates with the valve stem 90. The output from each system is the top "floating" ring gear 20, which has an position indicator arrow 26 located on the upper surface and is seen through the 300 to 325 degree annular slot 28 on the scale plate 72. As the sun gear 16 is rotated, the arrow 26 rotates under the 300 to 325 degree annular slot 28 and points to a character on the turn number indicator 76 that is located on the "in use" face of the scale plate 72. For instance, if a valve operator rotates the valve stem 90 five turns from the closed position, the arrow 26 can rotate from zero to indicate five on the turn number indicator 76. The top ring gear 20 and the bottom ring gear 24 mate together to form a casing (shown but not referenced) around the sun gear 16 and planet gear 12. The bottom ring gear 24 is connected to the scale plate 72 and is held fixed. The top ring gear 20 rotates freely inside a cavity in the bottom ring gear 24. It is to be understood that more than two ring gears can be used.

For each position indicator 30, there are two factors in the design of the input/output gear ratios. The first factor is the gear ratio of the sub-assembly, without the top "floating" ring gear 20. In this embodiment, three sub-assemblies are used for six different models. The second factor is the gear ratio in the entire gear assembly 10, which includes the top "floating" ring gear 20. By increasing the number of teeth 22 in the top "floating" ring gear 20 from one to two more than the bottom "fixed" ring gear 24, two different output ratios are generated.

Based upon the number of top ring gear teeth 22 and bottom ring gear teeth 74 on the top ring gear 20 and bottom ring gear 24, and which gear is held "fixed" in the sub-assembly, the planet gear 12 can complete one revolution about the sun gear 16 and around the inward facing teeth 74 on the bottom "fixed" ring gear 24, after the sun gear 16 itself has rotated three revolutions.

In one embodiment, the top "floating" ring gear 20 is inserted into the bottom "fixed" ring gear 24, which has a recessed cavity that accepts it. The top "floating" ring gear 20 has two more teeth than the bottom "fixed" ring gear 24 has. This means that every time the planet gear 12 completes one revolution about the sun gear 16 and around the inward facing teeth 74 on the bottom "fixed" ring gear 24, which is accomplished by rotating the sun gear 16 three revolutions, the top "floating" ring gear 20 can rotate the distance of two teeth. In order for the top "floating" ring gear 20 to rotate one complete revolution in this example, the sun gear 16 can need to rotate 63 revolutions. Since the slot 28 on the scale plate 72 displays 300 to 325 degrees (0.83 to 0.903 revolutions), the turn number indicator 76 on both sides can indicate any of the disclosed ranges of turns, for example, from 0 to 57 turns (one for each direction of rotation). The number of teeth on the ring gears 20, 24 determines the number of turns that can be accomplished. The turn number indicator 76 labels the number of turns, which can be any number chosen using sound engineering judgment. The shape of the individual teeth can be any shape chosen using sound engineering judgment. In one embodiment, the gears and teeth are made of a low friction, self-lubricating polymer.

In another embodiment, the top "floating" ring gear 20 has one more tooth than the bottom "fixed" ring gear 24 has. This means that every time the planet gear 12 completes one revolution about the sun gear 16 and around the inward facing teeth 74 on the bottom "fixed" ring gear 24, which is accomplished by rotating the sun gear 16 three revolutions, the top "floating" ring gear 20 can rotate the distance of one tooth. In order for the top "floating" ring gear 20 to rotate one complete revolution in this example, the sun gear 16 can need to rotate 123 revolutions. Since the slot 28 on the scale plate 72 displays 300 to 325 degrees (0.83 to 0.903 revolutions), the turn number indicator 76 on both sides can indicate from 0 to 111 turns (one for each direction of rotation). Rotating the distance of one tooth, rather than the two teeth that the other embodiment rotates, can allow the arrow 26 to rotate at half the rate of the previous embodiment.

In one embodiment, the position indicator 30 provides the ability to effectively indicate position of valves 40 with 57 turns or less. The position indicator 30 shows a meaningful amount of movement in the position indicator arrow 26. If the arrow 26 only moves a small distance, say 5% of the opening of the indicating window 36, it does not give the user a meaningful view of how many times the valve 40 has been turned and how many more turns are required to fully open, or fully closed. This embodiment provides a 57 turn model by increasing the number of teeth 22 in the "floating" ring gear 20. This accommodates the most common sizes of gate valves 40 used in an underground distribution system and other piping systems, and also plug valves, mud valves, and other valve types with a small number of turns to open.

In one embodiment, the position indicator 30 provides the ability to effectively indicate position of valves 40 with more than 250 turns. The most common sizes of butterfly valves range between 48 to 72 turns. However, the number of turns for mud valves ranges from 5 to 22 turns. For gate valves, which range from 2 inches to 66 inches, the number of turns ranges from as low as 8 turns to as much as 800 turns. Some prior art models are designed for too many turns to handle the limited number of turns for most mud valves and smaller sizes of gate valves. For example, for a valve with only 5 turns to open, the position indicator arrow 26 would only move about 5% of the turn number indicator 76. That would generally be considered too little movement from the open to closed positions. In this embodiment, the position indicator arrow 26 moves at least 10% of the turn number indicator 76.

Some valves 40 that are buried in the ground or submerged in water or wastewater typically require extension stems 44. Extension stems 44 that are submerged are extended beyond the water level and supported by a wall bracket 82 that is bolted to the wall. Two options to operate the valve 40 include a floorstand or a floor box. An indicating floorstand provides position indication. When the stem 44 terminates in a concrete floor, a floor box is used.

The floor box provides access to the two inch square nut on top of the valve's extension stem 44, to open or close the valve 40.

Figure 3:
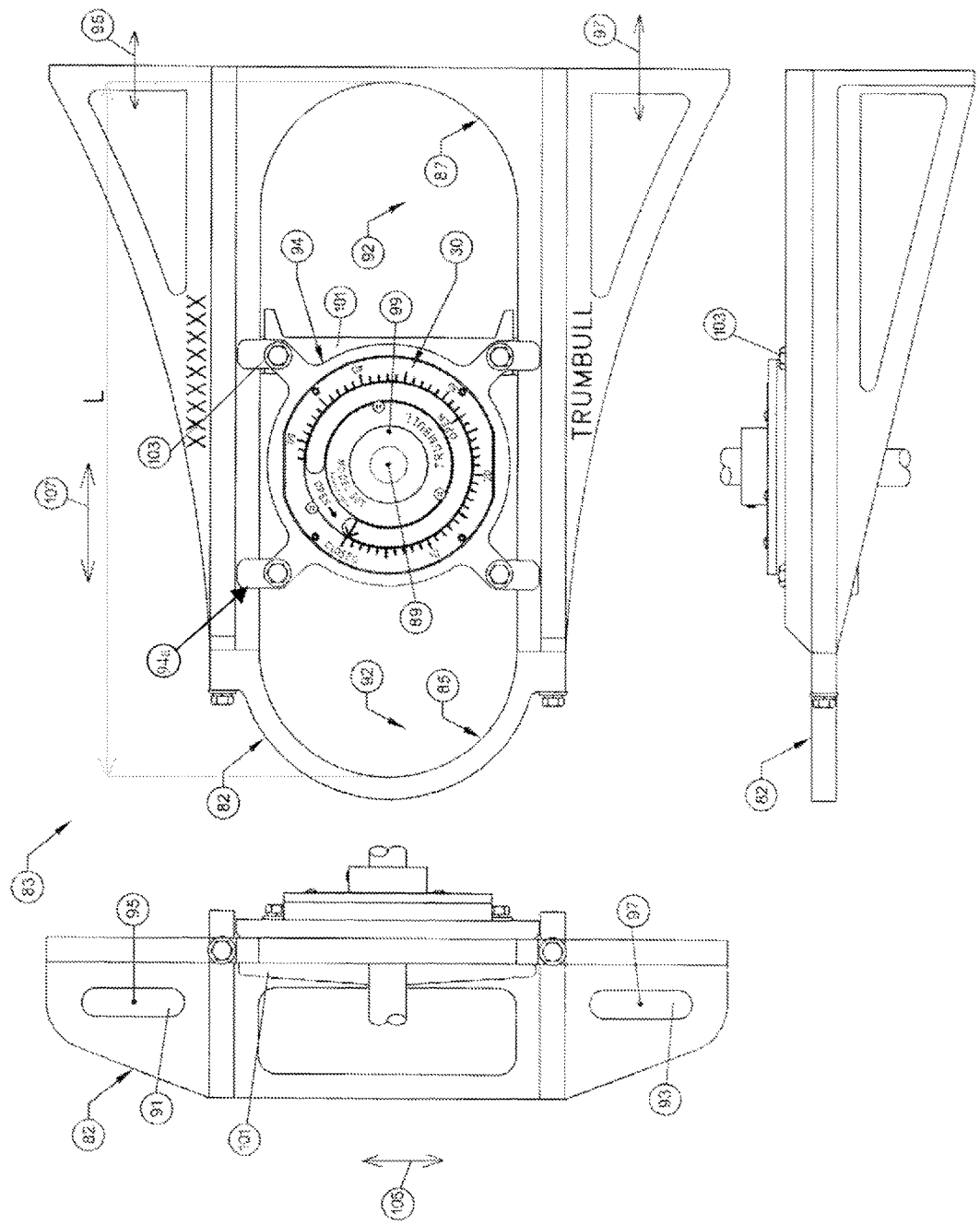
FIG. 3 shows several views of a wall bracket with the valve position assembly.
Figure 4:
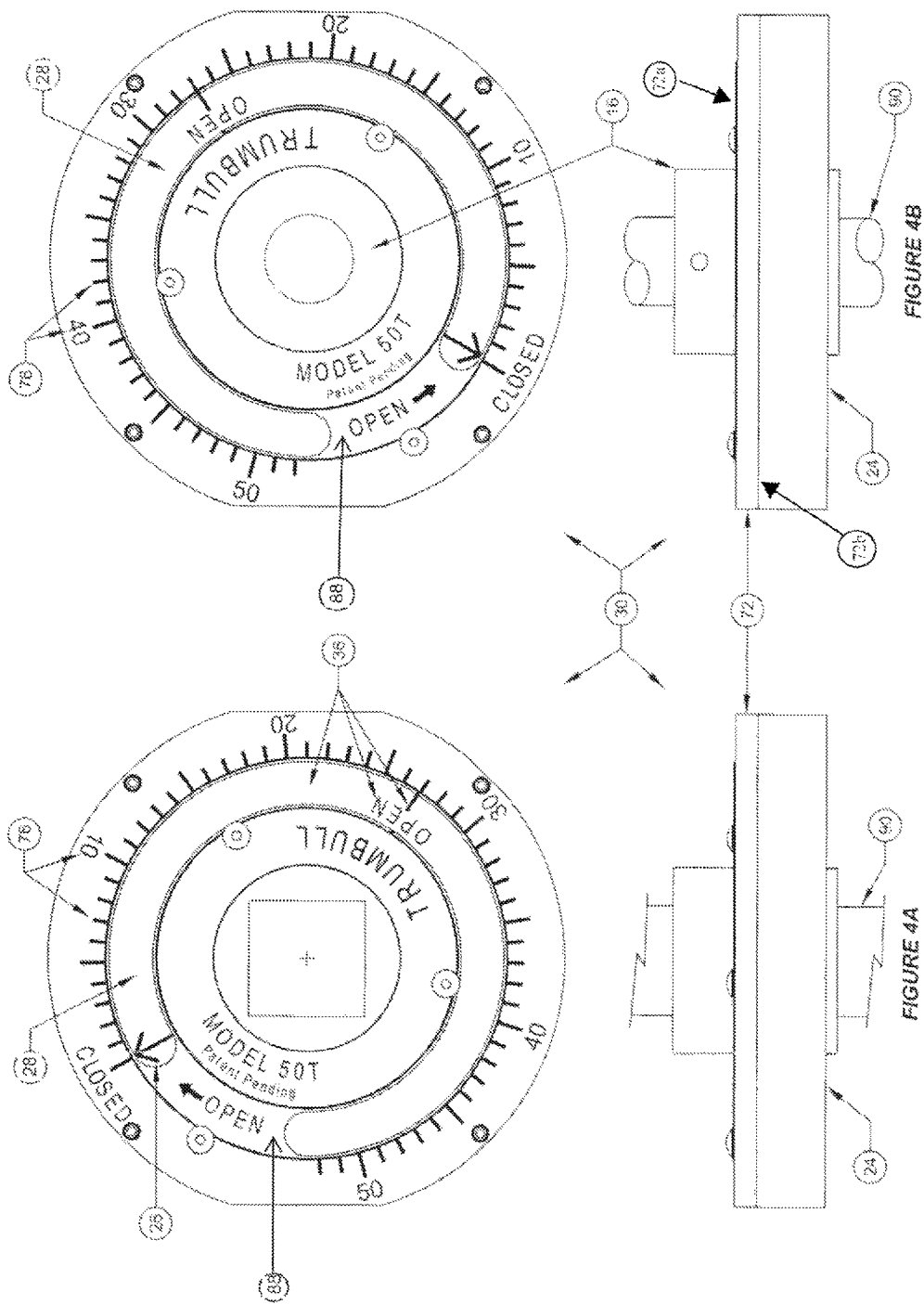
FIG. 4A shows a top and side view of the position indicator with a square bored sun gear.
FIG. 4B shows a top and side view of the position indicator with a round bored sun gear.
Figure 5:
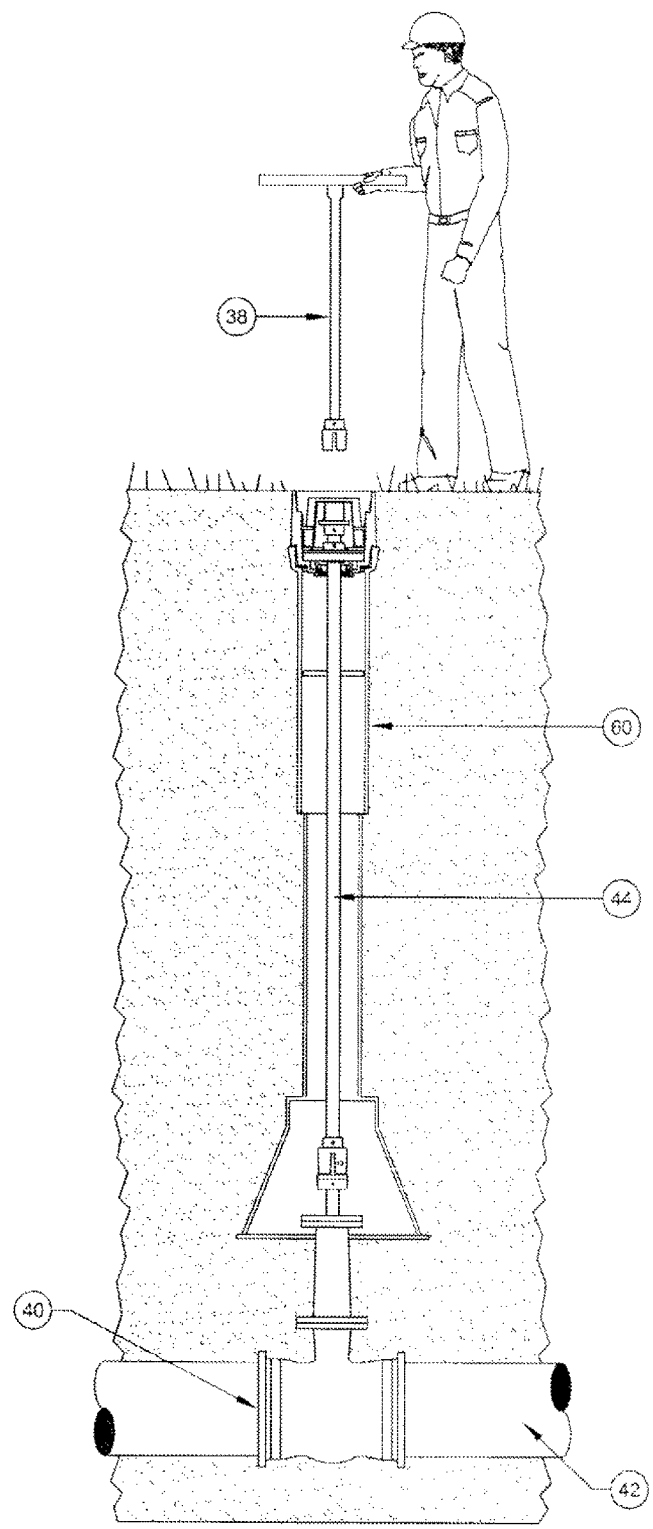
FIG. 5 shows a perspective view of the position indicator and adapter installation for underground valves.

In one embodiment, shown in FIG. 3, a wall bracket 82 is used to secure the position indicator 30, forming an exemplary valve position indicator assembly 83. The wall bracket 82 is designed for adjustability. The bracket 82 has a slot 92 that allows horizontal adjustability of the adapter plate 94. The slot 92 extends a length L between first and second ends 85, 87. The first and second ends 85, 87 of the slot 92 are arcuate and separated from one another by straight section of the slot 92. The length of the slot 92 can be greater than the width of the slot 92. The length L is transverse to an axis of the input rotation, this axis referenced at 89. The output rotation in the exemplary embodiment is also about the axis 89. The length of the slot 92 can be sufficiently long to allow securement of the position indicator 30 into a first position relative to the bracket 82 and into a second position relative to the bracket 82 significantly different from the first position. As shown on FIG. 3, the position indicator 30 with its gearing assembly and the position indicia 26 and the scale plate 72 are mounted with respect to the first slot 92 for adjustable positioning over at least part of the length L.

FIG. 3 shows that the exemplary mounting bracket 82 includes a plurality of mounting apertures 91, 93. The exemplary mounting apertures 91, 93 are slots. As shown by the various views of FIG. 3, the slot 92 and the slots 91, 93 are defined in respective first and second planes that are transverse to one another (since both all slots 91, 92, 93 are not all jointly visible in any view). Each of the plurality of mounting apertures 91, 93 can be centered on a respective mounting aperture axes 95, 97. FIG. 3 also shows that the slot 92 can be centered on a first slot axis 99 extending transverse to the length L. The exemplary first slot axis 99 is transverse to the mounting apertures axes 95, 97.

The position indicator 30 can be fixed in the bracket 92 with the adaptor or mounting plate 94. The mounting plate 94 can have an aperture receiving the position indicator 30. The mounting plate 94 can be disposed between the gearing assembly of the position indicator 30 and the slot 92. The exemplary mounting plate 94 includes an outer projection surface 94a resting on the mounting bracket 82. At least a portion of the mounting bracket 92 can be disposed between at least one clamping plate 101 and the mounting plate 94. At least one fastener 103 can pass through the mounting plate 94 and the at least one clamping plate 101. Turning the fastener 103 urges the at least one clamping plate 101 and the mounting plate 94 together to fix the gearing assembly with respect to the mounting bracket 82.

In operation, the bracket 82 can be fixed to a wall. The position of the mounting bracket 82 with respect to the wall can be shifted as desired by rectilinear movement (referenced at 105) transverse to the axis 89 of the output rotation. This movement is permitted since the mounting apertures 91, 93 are slots. After the mounting bracket 82 is fixed to the wall, the position indicator assembly 30 can be placed inside the mounting plate 94 first and then that sub-assembly can be positioned along the length to a position that is desired. The position of at least one of the gearing assembly and the position indicia and the scale plate with respect to the wall can be shifted by a rectilinear movement (referenced at 107) transverse to the axis 89 of the output rotation. The assembly 83 can be used to operate valves inside of a recessed water tank from ground level, at the top of a wall. Slot adjustability can accommodate valves installed at different offsets from the wall (at the bottom of the tank). The slot 92 gives the user adjustability to match the mounting plate 94 offset from the wall to the valve offset from the wall.

In one embodiment, a debris shield 52 is used to cover the position indicator 30. When valves 40 are installed underground, their locations are frequently in the street. The lids 48 covering the adapters 54 and valve boxes 60 are not sealed tightly. It is common for dirt, asphalt, and slag to pass the lid 48, making it possible for the adjustable window 36 of a position indicator arrow 26 to be covered with foreign material. In order to keep the window 36 clean, the debris shield 52 is placed over the position indicator 30, the user can simply dump out the debris shield 52 before operating the valve 40 and viewing its window 36. The debris shield 52 has a top surface (first end) 80, and stacking flanges 78. The stacking flanges 78 allow multiple debris shields 52 to be stacked prior to use, as is shown in FIG. 11C. The debris shield 52 may have a second end 140, an outwardly extending annular pocket 130, and, inclined frustoconical sides 120 such that an inner diameter of the pocket 130 at the first end 80 of the debris shield 52 is greater than an outer diameter of the shield at the second end 140 of the debris shield 52.

In one embodiment, the sun gear 16 is provided with a square bore, to fit an extension stem made of square tubing or bar stock. Some users feel a square bore is better suited for a particular application, since the flat sides of the extension stem 44 turn the flat inside of the sun gear 16. In contrast with a round stem, reliance is placed on a pin in the sun gear 16 to turn the stem.

Figure 6A:
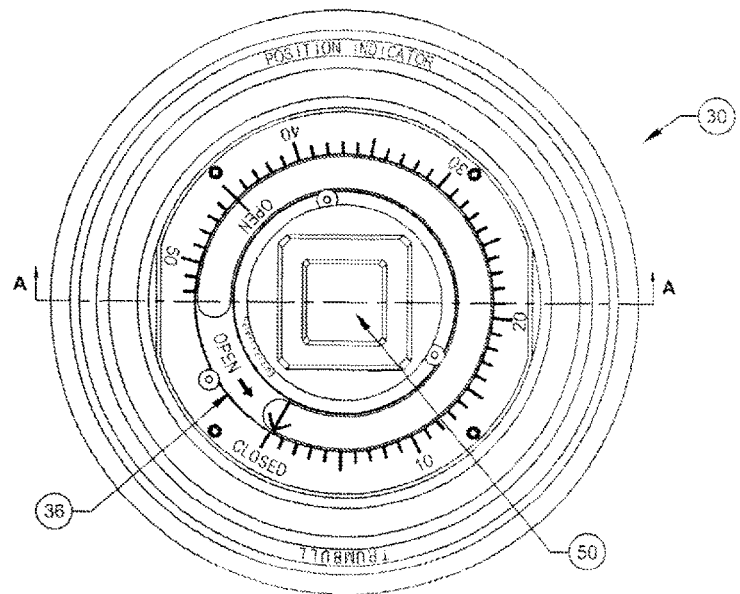
FIG. 6A shows a top view of the position indicator with a square nut inside an adapter for underground valves.
Figure 6B:
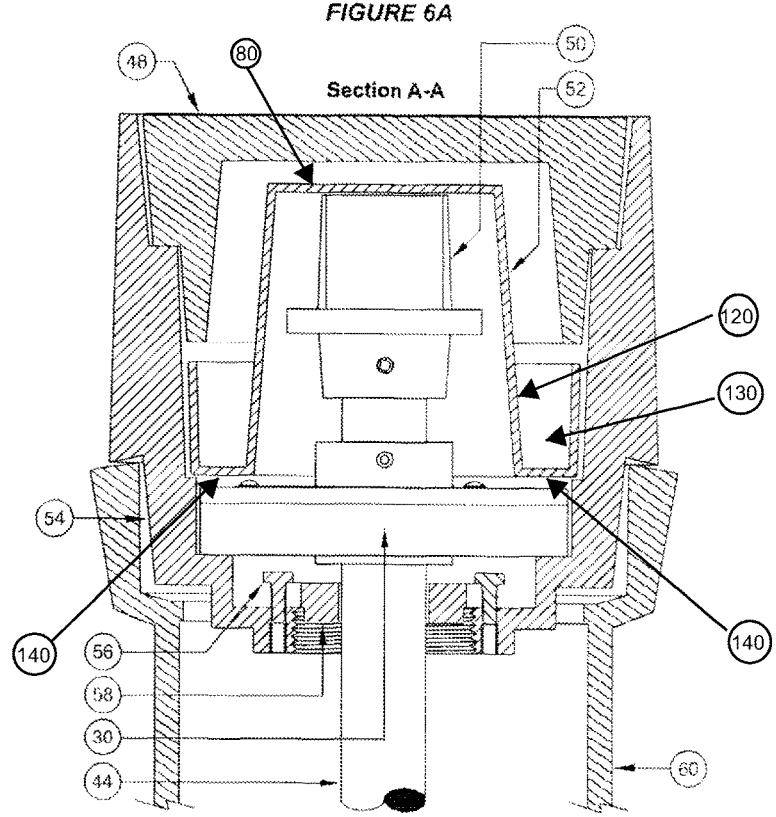
FIG. 6B shows a sectional view of the position indicator installed in an adapter, with a debris shield, square nut and valve box lid, for underground valves.

In another embodiment, the adapter 54 allows the use of round extension stems up to 1⅞" outside diameter. This is significant in the case of larger sizes of valves, that require more torque to operate and therefore larger sizes of extension stem to operate, without twisting. In one embodiment, the adapter 54 has pipe threads at the bottom. Pipe nipple 62 allows the adapter 54 to be height-adjustable to accommodate differences in floor thickness. In another embodiment, a bushing 58 can be provided inside the adapter 54 surrounding the extension stem 44 to accommodate different extension stem diameters, as shown in FIGS. 6B and 7C. Bolts 56 can also be provided for securing purposes.

In one embodiment, the user can double the number of turns simply by interchanging a ring gear 20 with another, having one less tooth 22, then making a corresponding change in the scale plate 72. The changing of these two components is simple and can be done easily in the field, or in a distributor's warehouse.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Further, the "invention" as that term is used in this document is what is claimed in the claims of this document. The right to claim elements and/or sub-combinations that are disclosed herein as other inventions in other patent documents is hereby unconditionally reserved.

What is claimed is:

1. A debris shield for a valve position indicator comprising;

a first end;

a second end;

an outwardly extending annular pocket; and, inclined frustoconical sides such that an inner diameter of the pocket at the first end of the debris shield is greater than an outer diameter of the shield at the second end of the debris shield.

2. The debris shield of claim 1 further comprising a stacking flange.

3. The debris shield of claim 1 wherein two or more debris shields are adapted to be stacked on top of each other.

4. The debris shield of claim 1 wherein the debris shield is adapted to be used on a valve position indicator that is installed on a floorstand.

5. A method of using a debris shield with a valve position indicator comprising the steps of:

a. providing a debris shield comprising:

a first end;

a second end;

an outwardly extending annular pocket; and, inclined frustoconical sides such that an inner diameter of the pocket at the first end of the debris shield is greater than an outer diameter of the shield at the second end of the debris shield;

b. placing the debris shield over a valve position indicator when the valve position indicator is not otherwise being operated or read;

c. removing the debris shield from the valve position indicator when the valve position indicator is to be operated or read;

d. dumping accumulated debris from the annular pocket of the debris shield.

6. The method of claim 5 wherein the debris shield provided in step (a) further comprises a stacking flange.

7. The method of claim 6 further comprising the step of stacking two or more debris shields for storage or when the two or more debris shields are otherwise not in use with the valve position indicator.

8. The method of claim 7 wherein the valve position indicator is installed on a floorstand.

9. The method of claim 6 wherein the valve position indicator is installed on a floorstand.

10. The method of claim 5 wherein the valve position indicator is installed on a floorstand.

\* \* \* \* \*